(12) United States Patent
Chambard et al.

(10) Patent No.: US 9,352,826 B2
(45) Date of Patent: May 31, 2016

(54) METHOD OF USING AND RENOVATING A DISK FROM A STACK OF DISKS

(71) Applicant: MESSIER-BUGATTI-DOWTY, Velizy Villacoublay (FR)

(72) Inventors: Pierre Chambard, Velizy-Villacoublay (FR); Jean-Baptiste Vaney, Velizy-Villacoublay (FR)

(73) Assignee: MESSIER-BUGATTI-DOWTY, Velizy-Villacoublay (FR)

( * ) Notice: Subject to any disclaimer, the term of this patent is extended or adjusted under 35 U.S.C. 154(b) by 0 days.

(21) Appl. No.: 14/314,954

(22) Filed: Jun. 25, 2014

(65) Prior Publication Data
US 2015/0001009 A1 Jan. 1, 2015

(30) Foreign Application Priority Data

Jun. 26, 2013 (FR) ...................................... 13 56131

(51) Int. Cl.
*B64C 25/42* (2006.01)
*F16D 55/36* (2006.01)
*B60T 1/06* (2006.01)
*F16D 55/00* (2006.01)

(52) U.S. Cl.
CPC ................. *B64C 25/42* (2013.01); *B60T 1/065* (2013.01); *F16D 55/36* (2013.01); *F16D 2055/0095* (2013.01); *F16D 2200/0052* (2013.01)

(58) Field of Classification Search
CPC ... B23P 6/00; F16D 2065/132; F16D 65/127; F16D 65/0043; F16D 55/36; Y10T 29/49723; Y10T 29/49726; Y10T 29/4973; Y10T 29/49734; Y10T 29/49737
See application file for complete search history.

(56) References Cited

U.S. PATENT DOCUMENTS

| | | | |
|---|---|---|---|
| 4,742,895 A | 5/1988 | Bok | |
| 5,099,960 A | 3/1992 | Alev | |
| 6,340,075 B1 * | 1/2002 | Bok et al. .................... | 188/71.7 |
| 2004/0112687 A1 | 6/2004 | McAfee et al. | |
| 2012/0263419 A1 * | 10/2012 | Briggs et al. ................... | 385/56 |

OTHER PUBLICATIONS

French Search Report of FR 13 56131 dated May 6, 2014.

* cited by examiner

*Primary Examiner* — Vishal Sahni
(74) *Attorney, Agent, or Firm* — Sughrue Mion, PLLC

(57) ABSTRACT

The invention relates to a method of using and renovating a brake disk (9), the method comprising steps of using the disk in a plurality of lives and compensating for a reduction in the thickness of the disk after each life by assembling the disk with a complementary portion or by associating the disk with another disk of rotor or stator type if the disk is itself respectively of stator or rotor type.

8 Claims, 3 Drawing Sheets

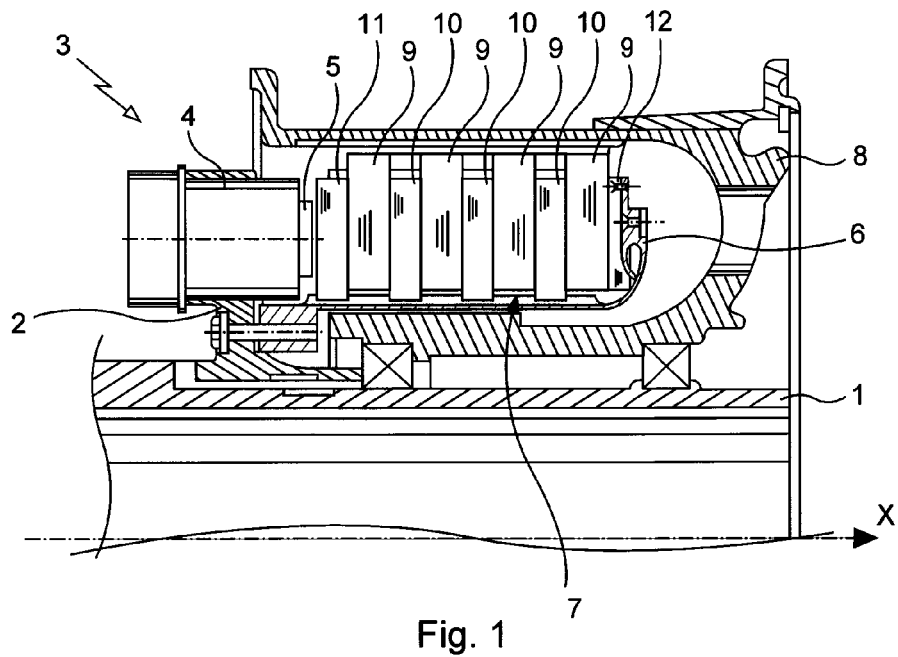
Fig. 1
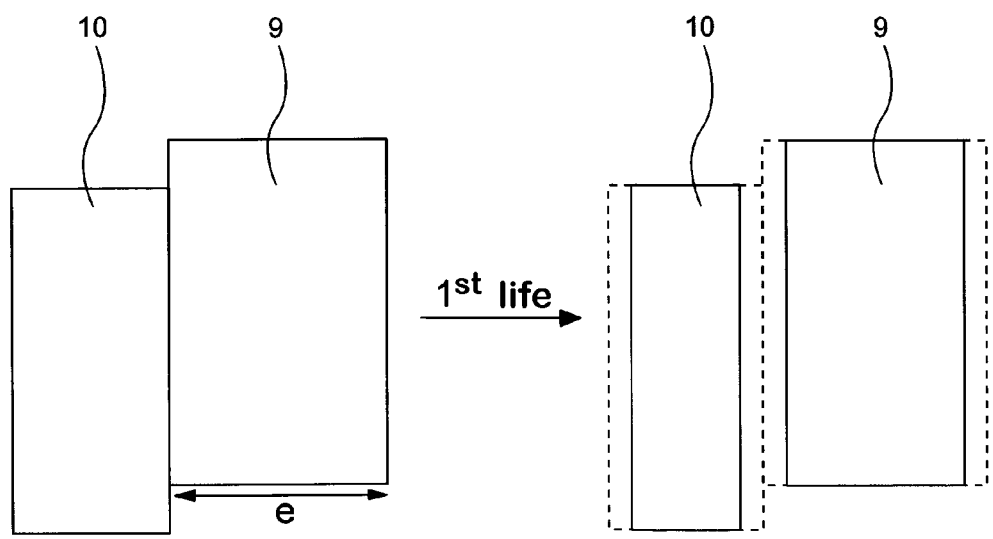
Fig. 2a                    Fig. 2b

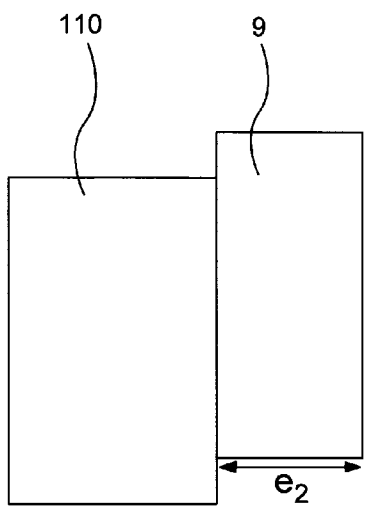
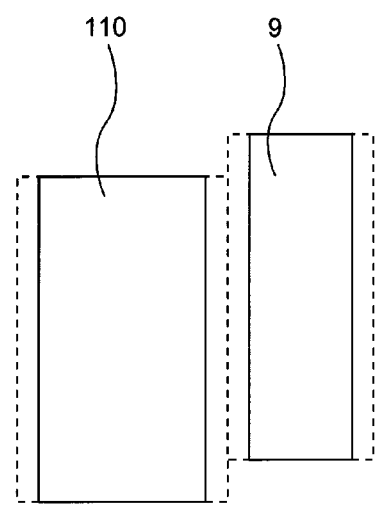
Fig. 3a                    Fig. 3b
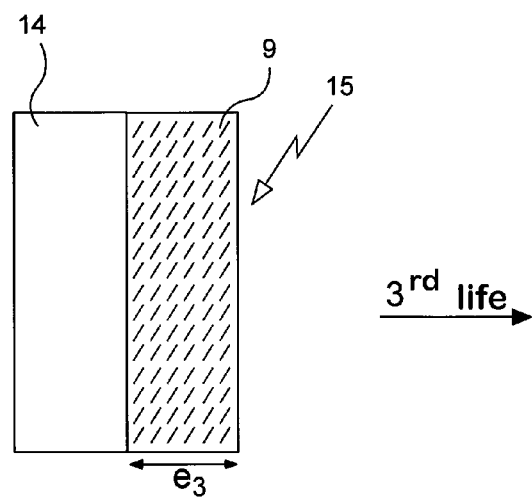
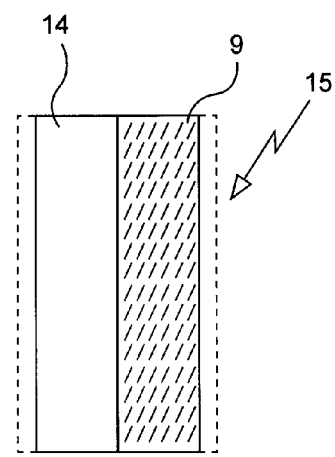
Fig. 5a                    Fig. 5b

METHOD OF USING AND RENOVATING A DISK FROM A STACK OF DISKS

The invention relates to a method of using and renovating a disk from a stack of disks of a vehicle brake.

TECHNOLOGICAL BACKGROUND OF THE INVENTION

The braking systems of most modern aircraft comprise brakes made up of disks stacked around a torsion tube, together with braking actuators carried by a ring and controlled to apply a braking force on the disk in order to exert a braking torque on the braked wheels of the aircraft, tending to slow the aircraft down. The disks include stator disks that are secured to the torsion tube and rotor disks that are constrained to rotate with the rim of the wheel.

During braking, the disks are subject to wear, thus making it necessary to perform regular maintenance operations on the stack of disks in order to replace some or all of the disks in the stack so that the brake can continue to deliver the braking forces that are required of it. Once the wear stroke of the brake stack has been used up, the stack of disks is removed from the brake and sent to an inspection/renovation service.

OBJECT OF THE INVENTION

An object of the invention is to propose a method of using and renovating a disk from a stack of disks that makes it possible to achieve a high degree of reuse of worn disks.

BRIEF SUMMARY OF THE INVENTION

The invention provides a method of use and renovation for using and renovating a first brake disk, the first disk having an initial thickness at the beginning of a first life and being of the rotor type or of the stator type, the method comprising the steps of using the first disk during a first life in a first stack of brake disks and using the first disk during two other lives, while compensating for a reduction in the thickness of the first disk after each life in application of the following provisions:
  after the first life, surfacing the first disk and associating the first disk with a second disk in a second stack of brake disks, the second disk having thickness lying in the range 60% to 140% of the initial thickness and being a disk of type different from the first disk;
  after a second life at the end of which the first disk has thickness lying in the range 50% of the initial thickness to 50% of the thickness of the first disk at the end of its first life, surfacing the first disk and assembling it with a complementary portion of substantially the same thickness in order to form a complemented disk that is used in a third stack of brake disks and that is of the same type as the first disk;
  after a third life, discarding the first disk.

As a result, the first disk is used during three lives before it is necessary to replace it with a new disk. The lifetime of the first disk is thus improved.

Furthermore, it is found that the cost of recycling such a first disk is not very high. By associating the first disk at the beginning of its second life with another disk of another type, a limit is put on any need to create complementary portions from new disks or to renovate old disks as complementary portions, where these operations are expensive in terms of money and time.

Furthermore, by means of the invention, it is possible to have a difference of thickness between the first disk at the beginning of the first life and the first disk at the beginning of the second life, and a difference of thickness between the first disk at the beginning of second life and the first disk at the beginning of third life that are both quite large. As a result, each life of the first disk can be very long: it becomes possible to subject the first disk to a considerable amount of wear before it is necessary to compensate for its loss of thickness.

Throughout this application, the term "life" is used to mean a cycle of use of the first disk in a stack of disks while the stack of disks is mounted on a vehicle and is being subjected to successive braking operations, the life beginning when the stack of disks is mounted on the vehicle and ending when the stack of disks is removed from the vehicle and sent to a workshop for inspection and maintenance.

Similarly, the term "disk" is used to mean a generally annular friction element that presents the initial thickness at the beginning of its first life and that is subjected to wear of its friction faces during each of the following lives, which wear causes its thickness to be decreased.

Similarly, the term "assemble" is used to mean adding a complementary portion to the first disk at the beginning of its third life so that the assembly of the complementary portion together with the first disk has thickness that is great enough to enable the assembly to be used during an additional life. The term "complemented disk" is used to mean an assembly comprising the first disk and a corresponding complementary portion.

The term "of stator type" (respectively "of rotor type") is used to mean that the disk is used throughout its three lives in the various brake stacks either as an intermediate and/or end stator disk (respectively as a rotor disk).

Likewise, the term "stator disk" covers all of the following disks in a stack of disks:
  intermediate stator disks;
  the first end stator disk, i.e. the stator disk against which the pusher applies thrust; and
  the second end stator disk, i.e. the stator disk against which a portion of the torsion tube rests.

The term "stator disk" covers any of the above-specified disks. An intermediate disk naturally means a disk in the stack of disks that is not at either of the ends of the stack of disks.

In the present application, a thickness is said to be "substantially equal" to a specified value when the thickness has a value that is close thereto, typically lying in a range within 5% of the specified value.

BRIEF DESCRIPTION OF THE DRAWINGS

The invention can better understood in the light of the following description given with reference to the figures of the accompanying drawings, in which:

FIG. 1 is a section view of an electromechanical brake;

FIGS. 2a and 2b are diagrams showing a disk of the stack of disks of the brake shown in FIG. 1, respectively at the beginning and at the end of the first life and in association with another disk;

FIGS. 3a and 3b are diagrams showing the disk of FIGS. 2a and 2b respectively at the beginning and at the end of the second life, and in association with another disk;

FIG. 4 shows a second stack of disks including the disk of FIG. 3a;

FIGS. 5a and 5b are diagrams showing the disks of FIGS. 2a and 2b respectively at the beginning and at the end of the third life, and assembled with another disk; and FIG. 6 shows a third stack of disks including the disk shown in FIG. 5a.

DETAILED DESCRIPTION OF THE INVENTION

Figure 4:
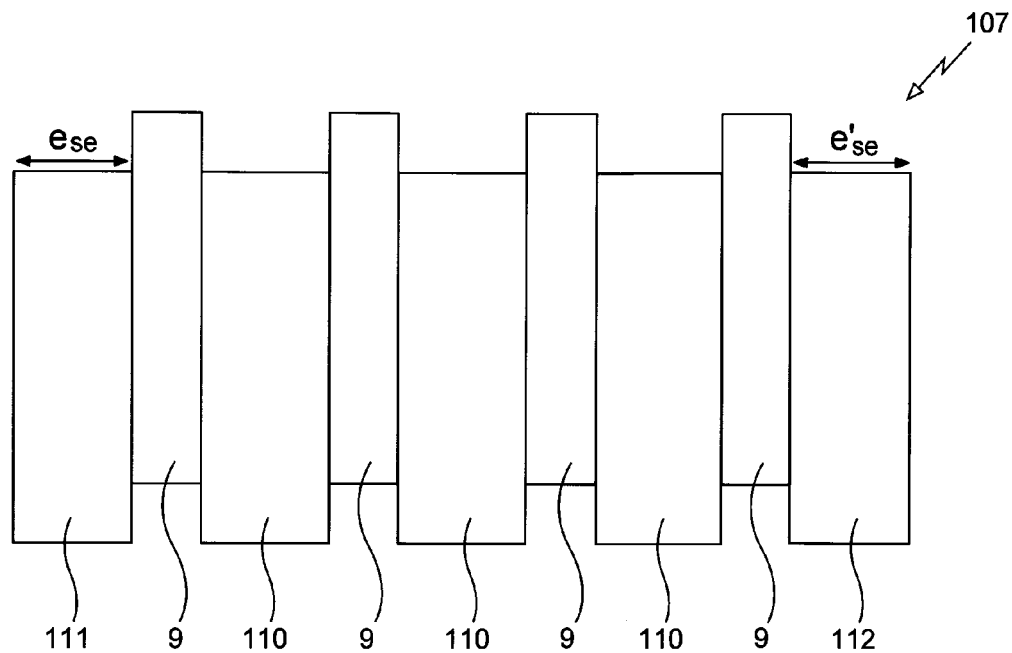

FIG. 1 shows a brake that is for braking an aircraft wheel mounted on an axle 1 of axis X.

The brake comprises a ring 2 mounted on the axle 1 and prevented from rotating relative thereto by means that are not shown. The ring 2 carries actuators 3 (only one of which is shown in FIG. 1), each comprising a housing 4 in which a pusher 5 is mounted to slide along an axial direction parallel to the axis X and to exert a braking force selectively on a first stack of disks 7 comprising an alternation of rotor disks constrained to rotate with a rim 8 of the wheel and of stator disks that are prevented from rotating by a torsion tube 6 secured to the ring 2.

The rotor disks and stator disks may be made of any material suitable for braking, such as carbon, for example. The rotor disks and the stator disks are preferably of the same material such that the various friction faces of the disks wear in substantially identical manner.

By way of example, the pusher 5 may be actuated by an electric motor of the associated actuator, the motor being arranged to cause one of the elements of a screw-and-nut system to rotate, e.g. a system of the ball or roller type, the pusher being associated to the other element of the system. An anti-rotation member prevents the pusher 5 from turning.

The application of a braking force causes the disks of the first stack of disks 7 to rub against one another so that a fraction of the kinetic energy of the aircraft is dissipated as heat. Nevertheless, the friction between the disks inevitably leads to the various friction faces of the rotor and stator disks being subjected to wear.

FIG. 2a thus shows one of the rotor disks 9 of the first stack of disks 7 and one of the stator disks of the first stack of disks 7. At the beginning of a first life, said rotor disk 9 has an initial thickness e. The disk 9 is then a one-piece disk. The disk 9 is thus used as such during the first life in the first stack of disks 7.

During said first life, the disk 9 becomes worn in substantially uniform manner on both of its faces, thereby leading to a reduction of its initial thickness e.

Thus, with reference to FIG. 2b, at the end of the first life, the disk 9 has a thickness that is less than the initial thickness e but greater than 50% of the initial thickness e. The reduction in the thickness of the disk 9 during the first life is represented by dashed lines.

With reference to FIG. 3a, the two faces of the disk 9 are surfaced in order to improve the surface state of said faces. The disk 9 then has a second thickness $e_2$ that is substantially equal in this example to 60% of the initial thickness e.

With reference to FIGS. 3a and 4, in order to compensate for the reduction in the thickness of the disk 9, as a result of the wear to which it has been subjected during the first life and also to some extent as a result of the surfacing, the disk 9 is used as a rotor disk in a new second stack of disks 107, being associated with at least one stator disk 110 that is at the beginning of its first life, in the method of the invention, and that therefore has thickness in this example that is substantially equal to the first thickness e. The disk 9 thus remains a single-piece disk during its second life. Naturally, the new stack of disks 107 may be mounted at the same location as the stack of disks 7.

The second stack of disks 107 preferably comprises only intermediate stator disks 110 that are all at the beginning of their first life, in the method of the invention, and that all present thickness substantially equal to the initial thickness e.

In addition, in this example, the second stack of disks 107 has a first end stator disk 111 that is at the beginning of its first life, in the method of the invention, and that has initial thickness $e_{se}$ that is substantially equal in this example to 85% of the initial thickness e. The second stack of disks 107 also has a second end stator disk 112 that is at the beginning of its first life, in the method of the invention, and that has an initial thickness $e'_{se}$ that is substantially equal in this example to 90% of the initial thickness e.

The second stack of disks 107 also has only rotor disks 9 that are all at the beginning of their second life, in the method of the invention, and that all have thickness that is substantially equal in this example to the second thickness $e_2$. In a particular implementation, the rotor disks 9 are all rotor disks 9 that were used in the first stack of disks 7 during a first life.

As a result, the second stack of disks 107 has as its rotor disks only disks that are recycled.

In this configuration, the stator disks 110, 111, and 112 are referred to as "thick" stator disks and the rotor disks 9 are referred to as "thin" rotor disks, given their respective thicknesses. The end stator disks 111 and 112 and the intermediate stators disk 110 are in fact much thicker than the rotor disks 9.

Thus, associating rotor disks 9 of smaller thickness with stator disks 110, 111, and 112 of greater thickness makes it possible to use the rotor disks 9 in the second stack of disks 107 during a second life without any need to assemble the rotor disks 9 together with complementary portions.

With reference to FIG. 1, preferably and in similar manner:
- all of the rotor disks 9 of the first stack of disks 7 are at the beginning of their first life and present thickness substantially equal to the initial thickness e;
- all of the intermediate stator disks 10 of the first stack of disks 7 are disks that have been renovated by the method of the invention so as to be at the beginning of their second life and so as to have thickness that is substantially equal, in this example, to the second thickness $e_2$;
- the first end disk 11 of the first stack of disks 7 is a disk that has been renovated by the method of the invention so as to be at the beginning of its second life and so as to have thickness that is substantially equal, in this example, to the second thickness $e_2$; and
- the second end disk 12 of the first stack of disks 7 is a disk renovated by the method of the invention so as to be at the beginning of its second life and so as to have thickness that is substantially equal, in this example, to the second thickness $e_2$.

In a particular implementation, the intermediate stator disks 10 are all intermediate stator disks that have been used in the same stack of disks during a first life, the first end stator disk 11 is the disk that was used as the first end disk in that stack of disks, and the second end disk 12 is the disk that was used as the second end disk in that stack of disks.

As a result, the first stack of disks 7 has as its stator disks 10, 11, and 12 only disks that have been recycled.

In this configuration, the rotor disks 9 are referred to as "thick" rotor disks and the stator disks 10, 11, and 12 are referred to as "thin" stator disks, given their respective thicknesses.

Thus, associating thicker rotor disks 9 with thinner stator disks 10, 11, and 12 makes it possible to use intermediate and end stator disks in the first stack of disks 7 during a second life without any need to assemble said stator disks with complementary portions.

During its second life, the disk 9 becomes worn in substantially uniform manner on both faces, thereby reducing the second thickness $e_2$.

Thus, with reference to FIG. 3b, at the end of the second life, the disk 9 in this example has a thickness that is substantially equal to 40% of the initial thickness e.

The reduction in thickness of the disk during the second life is represented in dashed lines.

With reference to FIG. 5a, the two faces of the disk 9 are surfaced in order to improve the surface states of said faces. The disk 9 is surfaced in this example until the disk 9 has a third thickness $e_3$ that is substantially equal to 40% of the initial thickness.

In order to compensate for the reduction in the thickness of the disk 9 between the beginning and the end of the second disk, the disk 9 is assembled with a complementary portion 14 of thickness that is substantially equal to the third thickness $e_3$ of the disk 9.

Methods for assembling a disk with a complementary portion are well-known in the prior art and are not described in greater detail herein. By way of example, the disk and the complementary portion may be assembled together by adhesive or by clipping using clips riveted to the disk and on to complementary portion.

The assembly 15 made up of the disk 9 together with the complementary portion 14 thus has thickness that is substantially equal in this example to 80% of the initial thickness e.

In a preferred implementation, the complementary portion 14 is another rotor disk at the beginning of a third life in the method of the invention, i.e. another rotor disk at the end of the second life and that has been surfaced.

As a result, in the method of the invention, there is no need to produce a complementary portion directly with the appropriate thickness by thinning down a new disk or a disk at the beginning of the second life. The complementary portion may be obtained by surfacing another rotor disk at the end of its second life in the method of the invention.

Figure 6:
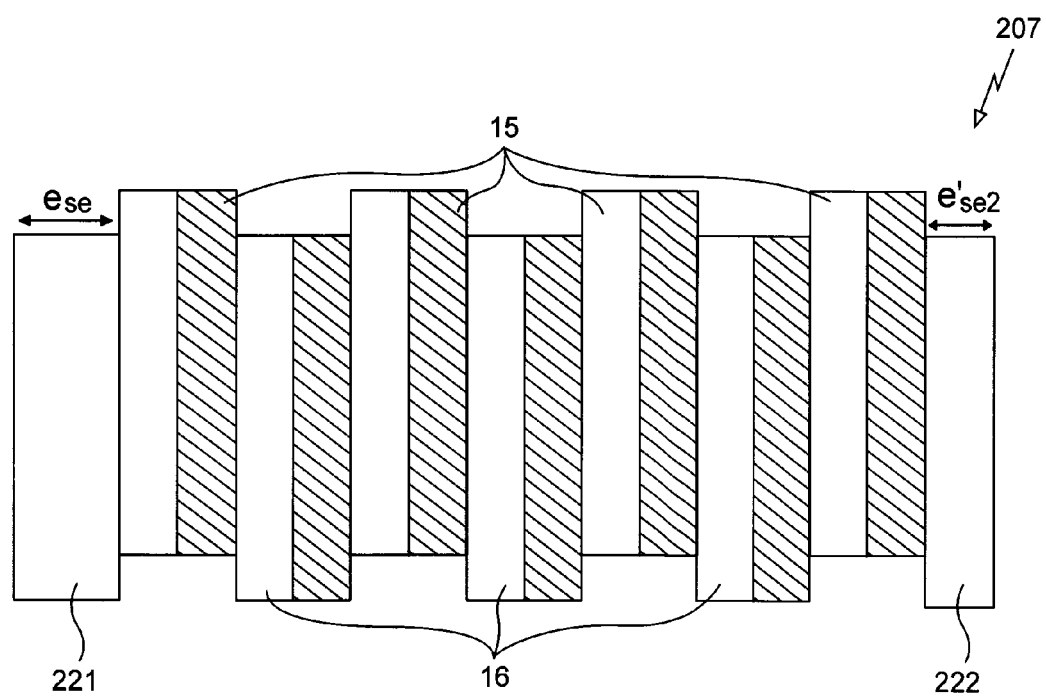

With reference to FIG. 6, the complemented disk 15 is then used as a rotor disk in a new third stack of disks 207. The disk 9 is thus used in the third stack of disks 207 during a third life. Naturally, the new stack of disks 207 may be mounted at the same location as the stack of disks 107 or the stack of disks 7.

The third stack of disks 207 preferably comprises only complemented disks 15 as rotor disks, presenting thickness substantially equal to 80% of the initial thickness e, and only complemented disks 16 as intermediate stator disks obtained by assembling stator disks at the beginning of their third life with complementary portions in the method of the invention.

As a result, the third stack of disks 207 has only recycled intermediate disks.

In a particular implementation, all of the rotor disks 9 used in the second stack of disks 107 during the second life in this example are disks that have been renovated by the method of the invention so as to be assembled with a complementary portion 14 in order to form complemented disks 15. The complementary portions 14 may for example all be the rotor disks that were used in another stack of disks during a second life in the method of the invention.

In a variant, half of the rotor disks 9 used in the second stack of disks 107 during a second life are surfaced so as to form complementary portions 14 and be assembled with the other half of the rotor disks 9 used in the second stack of disks 107 during a second life and renovated by the method of the invention. The third stack of disks 207 then has other complemented disks 15 obtained by recycling other rotor disks by the method of the invention.

The third stack of disks 207 preferably has at its first end stator disks 221 a disk of thickness substantially equal to the initial thickness $e_{se}$ and a second end stator disk 222 a disk having thickness $e'_{se2}$, which in this example is substantially equal to 65% of the initial thickness $e'_{se}$. The first end stator disk 221 is preferably a disk at the beginning of its first life in the method of the invention and the second end stator disk 222 is another disk at the beginning of its second life in the method of the invention. The second end disk 222 in this example is the second end disk 112 that was used during a first life in the second disk stack 107 and that has been surfaced.

During the third life of the disk 9, the complemented disk 15 wears in substantially uniform manner over both faces, i.e. uniformly on one of the faces of the disk 9 and on one of the faces of the complementary portion 14, thereby causing a reduction in the thickness of the complemented disk 15 and thus of the disk 9.

With reference to FIG. 5b, at the end of the third life, the disk 9 is finally discarded. The reduction in the thickness of the disk 9 during the third life is represented by dashed lines.

By means of the method of the invention, it is possible to renovate each disk and use it three times as follows:

|  | First life (the disk is then called "thick") | Second life (the disk is then called "thin") | Third life |
|---|---|---|---|
| Stator type disk | used as first end stator disk | used as first end stator disk | used in a complemented disk, itself used as an intermediate stator disk |
| Stator type disk | used as an intermediate stator disk | used as an intermediate stator disk | used in a complemented disk, itself used as an intermediate stator disk |
| Rotor type disk | used as a rotor disk | used as a rotor disk | used in a complemented disk, itself used as a rotor disk |
| Stator type disk | used as a second end stator disk | used as a second end stator disk | used in a complemented disk, itself used as an intermediate stator disk |

It should be observed that the invention makes it possible to use disks that have served as stator end disks for three lives. A stator end disk is usually covered in an anti-oxidant coating that tends to penetrate deeply into the end disk (to a depth of several millimeters). This anti-oxidant degrades the friction performance of the disk. By means of the invention, at the beginning of the third life, the stator disk is thin enough to contain little anti-oxidant or no anti-oxidant, while being thick enough to be capable of forming an complemented intermediate stator disk.

Various stack of disks can thus be made up in the invention. By way of example, it suffices to alternate the configurations in which the rotor disks all have a thickness substantially equal to the initial thickness e and the stator disks all have thickness substantially equal to the second thickness $e_2$, with configurations in which the stator disks all have thickness substantially equal to the initial thickness e and the rotor disks all have thickness substantially equal to the second $e_2$. Furthermore, when a large enough number of complemented disks can be made up from rotor and stator disks at the beginning of their lives, a stack of disks can be made up comprising only complemented disks as its intermediate disks.

By means of the method of the invention, it is possible to obtain the following brake stack configurations:

first configuration:
  first end stator disk at the beginning of its first life;
  intermediate stator disks at the beginning of their first lives;
  rotor disks at the beginning of their second lives; and
  second end stator disk at the beginning of its first life;
second configuration:
  first end stator disk at the beginning of its second life;
  rotor disks at the beginning of their first lives;
  intermediate stator disks at the beginning of their second lives; and
  second end stator disk at the beginning of its second life;
third configuration:
  first end stator disk at the beginning of its second life;
  complemented intermediate rotor disks, each made up of two rotor disks at the beginning of their third lives;
  complemented intermediate stator disks, each made up of two stator disks at the beginning of their third lives; and
  second end stator disk at the beginning of its first life; and
fourth configuration:
  first end stator disk at the beginning of its first life;
  complemented intermediate rotor disks, each made up of two rotor disks at the beginning of their third lives;
  complemented intermediate stator disks each made up of two stator disks at the beginning of their third lives; and
  second end stator disk at the beginning of its second life.

In the first configuration, all of the disks in the stack of disks can thus be recycled at the end of the cycle in the method of the invention: the rotor disks can be complemented in order to be used during third lives in a stack of disks in the third or fourth configuration, and the various stator disks can be used in a stack of disks in the second configuration by being associated with rotor disks at the beginning of their first lives.

Likewise, for the second configuration, all of the disks of the stack of disks can thus be recycled at the end of the cycle in the method of the invention: the various stator disks may be complemented in order to be used during third lives in a stack of disks in the third or the fourth configuration, and the various rotor disks can be used in a stack of disks in the first configuration by being associated with stator disks at the beginning of their first lives.

Naturally, the invention is not limited to the implementation described and variations may be made thereto without going beyond the ambit of the invention as defined by the claims.

The method is also applicable to disks for vehicle brakes other than aircraft brakes. The method is also applicable to disks of brakes other than electromechanical brakes, such as hydraulic brakes, for example.

Although the method is used for recycling and using a rotor type disk, the method could equally well be used for an intermediate or an end stator type disk.

The initial thickness is not necessarily the same for a first end stator disk, a second stator disk, an intermediate stator disk, and a rotor disk. The term "initial thickness" designates solely the thickness of the disk under consideration at the beginning of its first life in the method of the invention. Typically, the end stator disks present thickness at the beginning of their first lives lying between 60% and 140% of the thickness at the beginning of the first life of an intermediate stator disk or of a rotor disk.

Thus, although it is stated herein that the rotor disk is associated at the beginning of its second life with an intermediate stator disk of thickness substantially equal to the initial thickness of said rotor disk, a first disk at the beginning of its second life in the method of the invention could more generally be associated with another disk of thickness lying in the range 60% to 140% of the initial thickness of said disk. If consideration is given only to intermediate disks (rotor disks or stator disks), a first intermediate disk at the beginning of its second life in the method of the invention may be associated with another intermediate disk (respectively a stator disk or a rotor disk) having thickness lying in the range 95% to 105% of the initial thickness of said first intermediate disk.

In the same manner, at the beginning of the first life, a first disk could more generally be associated with another disk of thickness lying in the range 60% to 140% of the second thickness of said first disk. If consideration is given to intermediate disks only (rotor disks or stator disks), then a first intermediate disk at the beginning of its first life in the method of the invention may be associated with another intermediate disk (respectively a stator disk or a rotor disk) having thickness lying in the range 95% to 105% of the second thickness of said first intermediate disk.

Associating a rotor disk at the beginning of its first life with an intermediate stator disk at the beginning of its second life need not necessarily have the same thickness as associating a rotor disk at the beginning of its second life with an intermediate stator disk at the beginning of its first life. This depends mainly on the thickness of the end disks in the brake stack under consideration. Typically, associating a rotor disk at the beginning of its first life with an intermediate stator disk at the beginning of its second life gives rise to thickness lying in the range 100% to 105% of the thickness of associating a rotor disk at the beginning of its second life with a stator disk at the beginning of its first life.

Although it is stated herein that, at the end of its second life, a disk has thickness that is substantially equal to 40% of its initial thickness, the disk could more generally have thickness at the end of its second life lying in the range 50% of its initial thickness to 50% of its second thickness. An assembly made up of a disk with a complementary portion would then have thickness lying in the range the initial thickness e to the second thickness.

The invention claimed is:
1. A method of use and renovation for using and renovating a first brake disk (9), the first disk being of the rotor type or of the stator type, the method comprising the steps of using the first disk (9) during a first life in a first stack of brake disks (7), the first disk having an initial thickness at the beginning of this first life, and using the first disk (9) during two other lives while compensating for a reduction in the thickness of the first disk after each life in application of the following provisions:
  after the first life, surfacing the first disk (9), using the first disk in a second stack of brake disks (107) and associating the first disk (9) with a second disk (110) in the second stack of brake disks (107), the second disk having thickness lying in the range 60% to 140% of the initial thickness and being a disk of type different from the first disk;
  after a second life at the end of which the first disk has thickness lying in the range 50% of the initial thickness to 50% of the thickness of the first disk at the end of its first life, surfacing the first disk (9) and joining the first disk with a complementary portion (14) of substantially the same thickness in order to form a complemented disk, the complemented disk being used in a third stack of brake disks (207), the complemented disk being of the same type as the first disk;

after a third life, discarding the first disk.

2. A method according to claim 1, wherein the complementary portion (14) is another disk at the end of its second life that has been surfaced and that is of the same type as the first disk under consideration.

3. A method according to claim 1, wherein at the end of the second life, the first disk (9) is surfaced to a thickness of substantially 40% of the initial thickness.

4. A method according to claim 1, wherein at the beginning of the first life, the first disk (9) is associated with a third disk (10) in the first stack of brake disks (7), the third disk having thickness lying in the range 60% to 140% of the thickness of the first disk at the beginning of the second life of the first disk and being of type different from the first disk.

5. A stack of brake disks (7) comprising:
intermediate disks of rotor type, each at the beginning of the first life in the method of use and renovation according to claim 1;
intermediate disks of stator type, each at the beginning of the second life in the method of use and renovation according to claim 1; and
two end disks of stator type, each at the beginning of the second life in the method of use and renovation according to claim 1.

6. A stack of brake disks (107) comprising:
intermediate disks of rotor type, each at the beginning of the second life in the method of use and renovation according to claim 1;
intermediate disks of stator type, each at the beginning of the first life in the method of use and renovation according to claim 1; and
two end disks of stator type, each at the beginning of the first life in the method of use and renovation according to claim 1.

7. A stack of brake disks (207) comprising:
intermediate disks that are complemented disks in the method of use and renovation according to claim 1;
a first end disk of stator type, at the beginning of a first life in the method of use and renovation according to claim 1; and
a second end disk of stator type, at the beginning of a second life in the method of use and renovation according to claim 1.

8. A method of use and renovation for using and renovating a first brake disk (9), the first disk being of the rotor type or of the stator type, the method comprising the steps of using the first disk (9) during a first life in a first stack of brake disks (7), the first disk having an initial thickness at the beginning of this first life, and using the first disk (9) during two other lives while compensating for a reduction in the thickness of the first disk after each life in application of the following provisions:
after the first life, surfacing the first disk (9), using the first disk in a second stack of brake disks (107) and associating the first disk (9) with a second disk (110) in the second stack of brake disks (107), the second disk having thickness lying in the range 60% to 140% of the initial thickness and being a disk of type different from the first disk;
after a second life at the end of which the first disk has thickness lying in the range 50% of the initial thickness to 50% of the thickness of the first disk at the end of its first life, surfacing the first disk (9) and joining the first disk with a complementary portion (14) of substantially the same thickness in order to form a complemented disk, the complemented disk being used in a third stack of brake disks (207), the complemented disk being of the same type as the first disk and being used as only one disk in the third stack of brake disk, the complemented disk being associated with a third disk in the third stack of brake disks, the third disk being a disk of type different from the first disk;
after a third life, discarding the first disk.

* * * * *